(12) United States Patent
Trumbull

(10) Patent No.: US 7,070,277 B2
(45) Date of Patent: Jul. 4, 2006

(54) METHOD AND APPARATUS FOR PRODUCING DYNAMIC IMAGERY IN A VISUAL MEDIUM

(75) Inventor: Douglas Trumbull, Southfield, MA (US)

(73) Assignee: Entertainment Design Workshop, LLC, Sheffield, MA (US)

(*) Notice: Subject to any disclaimer, the term of this patent is extended or adjusted under 35 U.S.C. 154(b) by 413 days.

(21) Appl. No.: 10/342,735

(22) Filed: Jan. 15, 2003

(65) Prior Publication Data

US 2003/0174286 A1 Sep. 18, 2003

Related U.S. Application Data

(62) Division of application No. 10/099,662, filed on Mar. 14, 2002.

(51) Int. Cl.
*G03B 21/00* (2006.01)

(52) U.S. Cl. ...................................................... 352/243
(58) Field of Classification Search ................ 352/243; 345/419, 473, 582; 382/284, 293, 295
See application file for complete search history.

(56) References Cited

U.S. PATENT DOCUMENTS

| 4,283,766 | A | | 8/1981 | Snyder et al. |
|---|---|---|---|---|
| 4,899,097 | A | * | 2/1990 | Chapman ..................... 318/663 |
| 5,033,705 | A | * | 7/1991 | Reagan ................... 248/123.11 |
| 5,177,516 | A | | 1/1993 | Fitz et al. |
| 5,454,042 | A | | 9/1995 | Drever |
| 5,531,412 | A | * | 7/1996 | Ho .......................... 248/123.2 |
| 5,566,251 | A | | 10/1996 | Hanna et al. |
| 5,696,892 | A | | 12/1997 | Redmann et al. |
| 5,853,153 | A | | 12/1998 | Condrey |
| 5,856,862 | A | | 1/1999 | Kokush |
| 5,892,554 | A | | 4/1999 | DiCicco et al. |
| 5,923,791 | A | | 7/1999 | Hanna et al. |
| 6,084,590 | A | | 7/2000 | Robotham et al. |
| 6,122,013 | A | | 9/2000 | Tamir et al. |

OTHER PUBLICATIONS

K. Fukui, M. Hayashi, Y. Yamanouchi, "Virtual Studio System for TV Program Production", NHK Laboratories Note No. 447.

* cited by examiner

*Primary Examiner*—Rodney Fuller
(74) *Attorney, Agent, or Firm*—McCormick, Paulding & Huber LLP

(57) ABSTRACT

An apparatus for producing motion pictures using real time composites of computer generated virtual backgrounds and live foreground images recorded on a sound stage includes camera motion tracking, automated lighting control, on-line editing, and production and asset management to accelerate the pace and reduce the cost of motion picture production.

4 Claims, 10 Drawing Sheets

(7 of 10 Drawing Sheet(s) Filed in Color)

METHOD AND APPARATUS FOR PRODUCING DYNAMIC IMAGERY IN A VISUAL MEDIUM

CROSS REFERENCE TO RELATED APPLICATION

This application is a divisional of U.S. Ser. No. 10/099,662, filed Mar. 14, 2002, entitled "METHOD AND APPARATUS FOR PRODUCING DYNAMIC IMAGERY IN A VISUAL MEDIUM", and is hereby incorporated by reference in its entirety.

FIELD OF THE INVENTION

The present invention relates to motion picture production in general and to motion pictures that utilize virtual sets in particular.

BACKGROUND OF THE INVENTION

The cost of producing today's motion pictures, particularly action adventure, science fiction and fantasy films that utilize substantial digital visual effects, is increasing astronomically. Large scale productions, such as the movie Titanic, are high risk ventures, with escalating costs increasingly difficult to contain. Studios have responded to these economic realities by cutting the number of films they produce, canceling projects and moving production out of the country.

Digital technologies, and in particular computer generated imaging and Chromakey techniques to create special visual effects, have undoubtedly enhanced the creative potential of motion picture production. Digital visual effects, however, have generally been used in conjunction with conventional large scale production methods that involve major stars, large crews, exotic location shooting, lengthy shooting schedules and spectacular physical sets, and have tended to increase rather than decrease the cost of motion picture production.

What has been lacking is a comprehensive approach to incorporating digital technology into all phases of the motion picture production process to accelerate the pace of production and significantly decrease costs by reducing the downtime associated with set and lighting changes; by filming actors on a sound stage using photorealistic backgrounds of virtual worlds and characters in place of real environments and sets; and by providing immediate on-line editing capability both prior to and during the production process.

SUMMARY OF THE INVENTION

The present invention is directed to a method and apparatus for significantly reducing the cost of motion picture production. 'Motion picture' as used herein includes films, TV shows, IMAX 3D experiences, simulator rides, interactive games and the like.

In accordance with the present invention, motion pictures are produced on a sound stage using live actors, limited foreground sets and virtual background sets of computer generated images. Live action is filmed using Chromakey techniques, in which actors are filmed on a sound stage in front of a background of uniform color, usually blue or green. A keying unit detects those parts of the camera image that contain the "key" color, and replaces them with the background virtual set of computer generated images.

During filming, the virtual background sets are instantaneously composited with the live foreground action, to create a real-time "reference" composite which can be seen in a camera viewfinder, on monitors around the stage, and in a screen room, to facilitate fast and intuitive alignment of live action foreground with the virtual background and to allow various locations, compositions, scenes, and complex camera moves to be explored in real-time in a virtual environment. The "reference" composite is immediately available to a non-linear editor for editing both prior to and during principal photography.

The present invention includes a method and apparatus for producing a composite motion picture image on a stage using live images of characters and set components combined with computer generated images. The method includes generating a database of computer generated image element signals indicative of computer generated images, each image having a plurality of computer image elements, with a pre-established geometric position relative to one another. A database of computer image element position signals correlating the position of each of the image elements in a stage geometry is also generated. Character and set image element signals indicative of live character and set component images within the stage geometry is recorded, wherein each image has a plurality of character and set image elements. Simultaneously with the live character and set image element signals, character and set position signals which associate a character or set component position with a corresponding position in the stage geometry is also recorded. The method also includes generating recording apparatus position signals indicative of the position of a recording apparatus in the stage geometry and optical field signals indicative of the optical field of view of the recording apparatus for the live character and set component images. Optical parameter signals corresponding to the optical parameters of the recording apparatus are also recorded. The computer image element position signals are then modified in dependence on values of the recording apparatus position signals, optical parameter signals and optical field signals. Additionally, select ones of the character and set image element signals are identified to be replaced by select ones of the computer generated image element signals in dependence on the computer image element position signals and the character and set position signals. Further, the identified character and set image element signals are substituted with corresponding ones of the computer generated image element signals to form a set of initial composite image signals. The method than generates, in substantially real time, an initial composite image of the live character and set component images and the computer generated images from the initial composite image signals. The initial composite image is presented, in substantially real time, to a display associated with the recording apparatus.

This present method and apparatus substantially reduces the need to create expensive, large-scale physical sets and dramatically accelerates the shooting process by reducing the size of crews and the hours spent rigging, lighting and operating each set or location.

It is an objective of the present invention to simplify live action shooting, making it possible to greatly increase the number of set-ups per day.

It is a further objective to improve image quality and reduce lighting requirements by using an all-digital camera, thereby eliminating film handling, loading, processing, printing, projecting and scanning costs and delays.

It is still a further objective to dramatically reduce the cost of producing visual effects feature films through reduced set and crew costs and powerful photorealistic computer graphics imagery.

It is yet a further objective to simplify editing of scenes, sequences or an entire film using "reference" composites.

These and other objectives and advantages will become more readily apparent in light of the following description and associated drawings.

BRIEF DESCRIPTION OF THE DRAWINGS

The patent or application file contains at least one drawing executed in color. Copies of this patent or this patent application publication with colored drawing(s) will be provided by the Office upon request and payment of the necessary fee.

DETAILED DESCRIPTION OF THE PREFERRED EMBODIMENT

Figure 1:
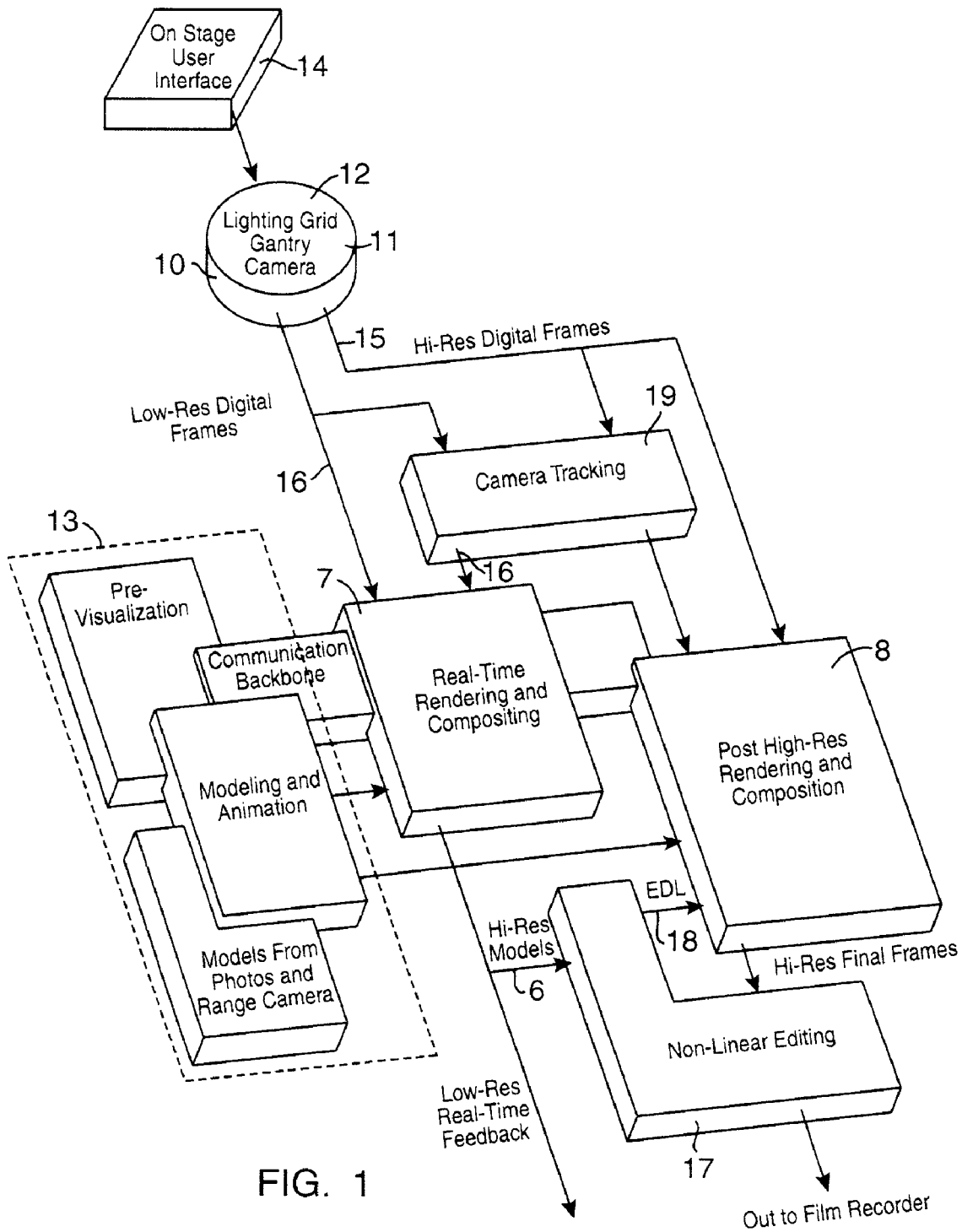
FIG. 1 is a schematic overview of the present invention.

A schematic overview of the preferred embodiment of the present invention is shown in FIG. 1. A high bandwidth digital movie camera 10 is mounted on a camera support system or gantry 11 designed to precisely position the camera 10 on a sound stage. Using Chromakey techniques, known to those skilled in the art, wherein a keying unit detects those parts of the camera image that contain the "key" color, and replaces them with a background image, actors are filmed on the sound stage typically against a blue screen or green screen cyclorama.

A database of virtual background sets 13 of computer generated images is constructed using computer graphics techniques known to those skilled in the art, which database comprises a digital backlot of environments and backdrops for the live action. Using the virtual set database 13, detailed blocking maps, storyboards and animatics are developed in preparation for the process of shooting a final scene.

The camera support system 11 includes an attached viewfinder, discussed below, for displaying both the camera image and a real-time composite image of the foreground live action against the virtual background image. A lighting grid 12 is automated to facilitate pre-planning and rapid changes from set to set.

Figure 2:
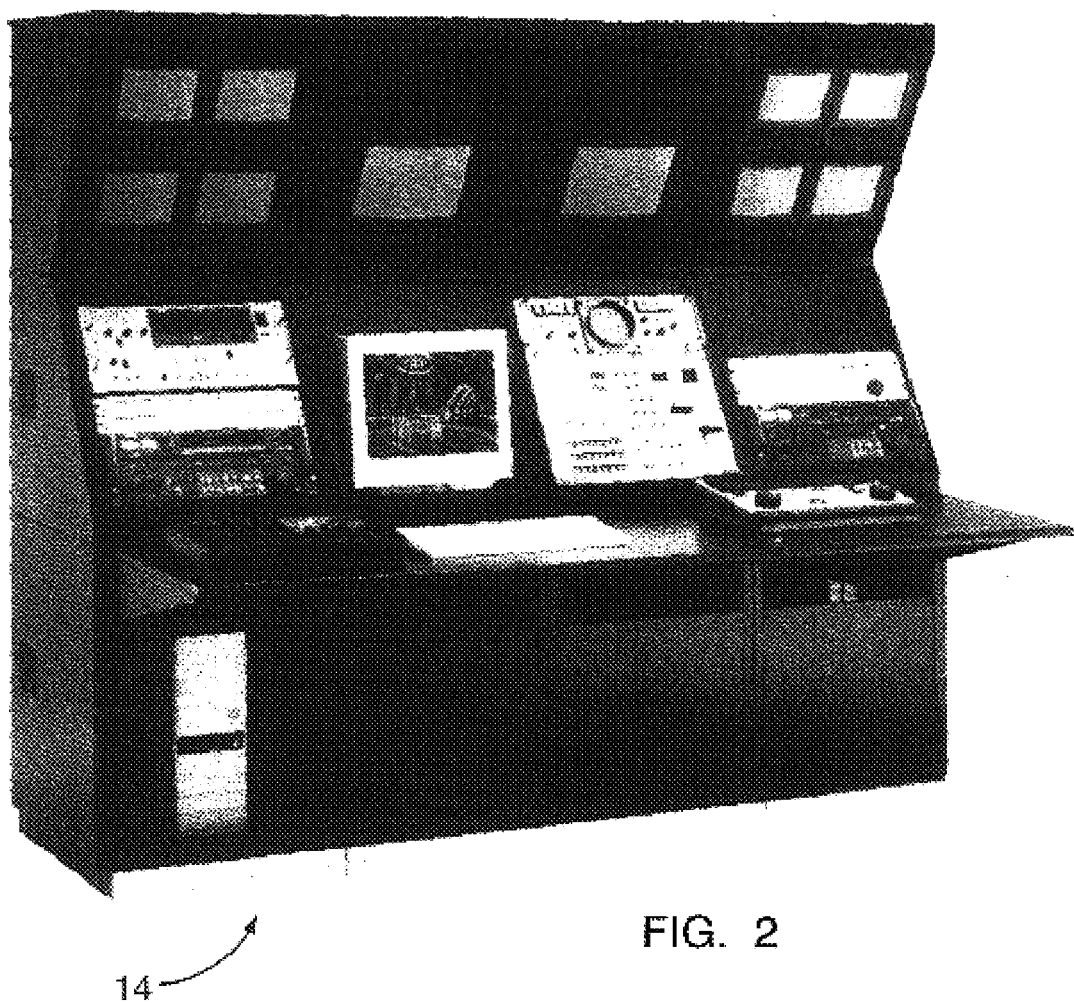
FIG. 2 is an illustration of an on-stage computer system used in the present invention.

Adjacent to the set on stage is an onstage user interface 14, typically a small cubicle, room or trailer "suite" such as that shown in FIG. 2, where the virtual background set database is composited in real time with the live action on stage. From this suite 14 all set-ups are predetermined, including lighting set-up, camera placement and orientation to physical sets and digital background, through the use of various grids or co-ordinates on the stage.

From the suite (FIG. 2), the composite image is made available to the camera viewfinder 31 (FIG. 3a), monitors around the stage, 35 (FIG. 3b), and, preferably to a screening room with large screen electronic projection 33 (FIG. 3c), for the director, cinematographer, cast and crew to explore, modify and prepare for photography. The recording process is supervised and managed from the suite 14 (FIG. 2) by an operator familiar with the digital model so he/she can orient, adjust, change, re-light, and play back on demand.

As indicated in FIG. 1, two recording systems operate simultaneously in the present invention. The high bandwidth camera signal 15 of the foreground image is digitally recorded, and at the same time, a down converted DI signal 16, recorded using standard DI equipment, is used to create a composite 14 with a virtual background in real-time. This second recording 16 is immediately available for review and editing. After a scene is shot, a direct video feed 6 from the real-time composite to a non-linear editor 17, such as the Avid™ editors for example, allows the director to confirm whether or not a cut is going to work. Using a frame accurate edit decision list 18(EDL) individual shots are more precisely rendered and composited so that final rendering 8 of images and composite shots is performed to exact cut lengths.

The first high bandwidth recording 15 is checked and stored for later use in the finished high-resolution composite. All recordings include meta-data i.e., time-code and continuity notes, as well as MOCODE data for later camera movement matching.

A motion tracking system 19 provides accurate control data to link live-action photography, or alternatively miniature photography, with the computer-generated imagery. The motion tracking system 19 simultaneously provides the control data included in the down converted DI signal 16 for low resolution real-time rendering and compositing 14 and high resolution data 15 for a master high-bandwidth tape used in post-production rendering and composition 8 which are non-real-time processes.

Post-production high-resolution rendering 8 includes rendering an image more realistic through the use of computer graphics effects such as shadows, ray tracing and reflections. For more complex polygonal models, the process includes adding radiosity, atmospheric density, smoke, fog as well as animated effects. Post-production compositing 8 includes matte line removal, wire and rig removal, and overall scene optimization, including grain management. Finally, the composite image is recorded to film 6 and prepared for standard negative cutting.

The aforementioned elements of the present invention are more specifically described as follows.

Figure 4:
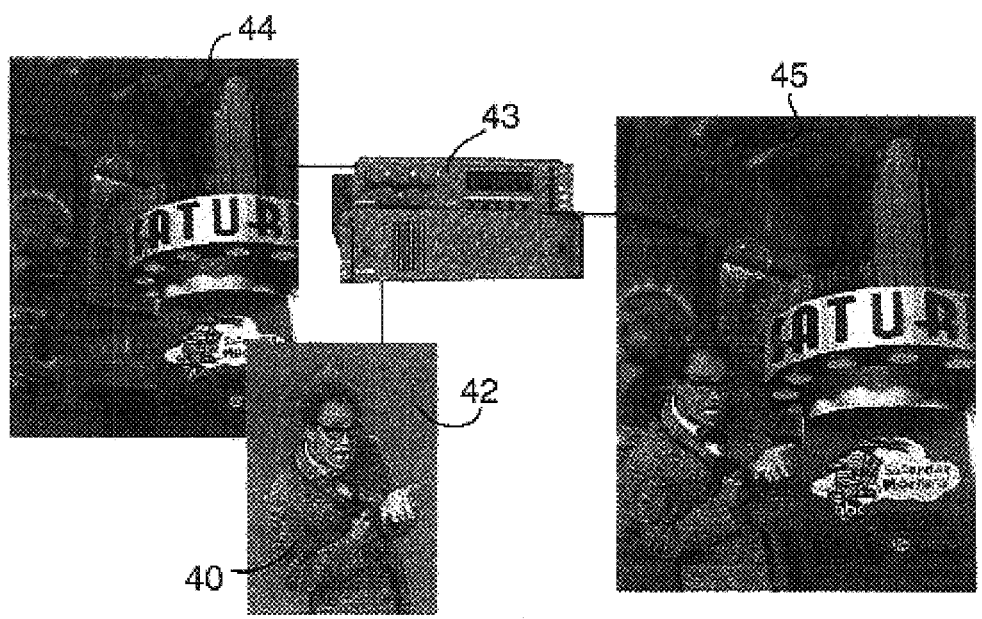
FIG. 4 depicts a typical Chromakey composite image.

Chromakey is a well-established technique in TV and Film production, that allows actors and props to be extracted from a camera image and superimposed onto another computer generated background to form a new composite image. Referring to FIG. 4, the actor 40 is filmed in front of a background 42 of retroreflective material of uniform color, usually blue or green, called a cyclorama. Retroreflective materials are usually made out of tiny glass beads with a reflective coating on half their surface. A keying unit 43 detects those parts of the camera image that contain the "key" color and replaces them with the virtual background image 44 that is in perspective with the camera point of view to create a composite 45.

Figure 5:
FIG. 5 illustrates a large screen cyclorama.

Referring to FIG. 5, embedded onto the cyclorama 50 is a computer-readable pattern 51 that typically comprises an uneven checkerboard of quadrilaterals having two alternating shades within the chromakey spectrum. The edges of the quadrilaterals are arranged along two dimensions which may be perpendicular, but need not be. In one embodiment, the computer readable pattern is comprised of superimposed horizontal and vertical bar codes.

The pattern 51 contains all the data necessary for a computerized pattern recognition program to calculate instantaneously all necessary camera and lens parameters, such as, focal length of the lens, proximity to the cyclorama, pan, tilt, roll, yaw and the camera's position on the stage in x, y and z coordinates.

To transform the background image to the perspective of the camera point of view, the physical parameters of the stage and props, such as the size of the walls, ceilings, floors and furniture, are first determined and stored in a database as numerical data. Using the numerical data, and the position and optical parameters of the camera derived from a motion tracking system (discussed below), the virtual background image is transformed using standard perspective transformation equations to be in perspective with respect to the orientation of the camera.

The foreground images are then composited with the accurately aligned computer generated background images and transmitted to a camera viewfinder and a non-linear editor for immediate editing. In the present invention such alignment and composition is performed in real time using a system such as the Ultimatte 9®, with features specifically designed for virtual studio applications, including automatic background defocusing, over-exposure control, color conformance with ambience and color controls, edge control, matte sizing, and positioning.

In an alternative embodiment, using a Chromakey technique developed by the BBC, a background made of a special retro-reflective material having a dark gray color under normal illumination is illuminated by light of a chosen key color mounted directly on the camera. This material has the advantages of eliminating colored spill onto actors and requiring only minimal studio lighting. Unlike conventional retro-reflective materials which only work well when the direction of the incident light is nearly at right angles to the material, this material maintains a high degree of retro-reflectivity over a very wide range of angles, reflecting nearly all incident light back in the direction from which it comes. As used in the present invention, the material reflects the colored light straight back into the camera and appears brightly lit regardless of the setting of the studio lights and even works in complete darkness. Since only minimal studio lighting is used to illuminate a shot, many of the lighting constraints associated with conventional Chromakeying methods are removed so that virtual production can be applied to genres of creative content not previously suitable to Chromakey techniques.

Figure 6:
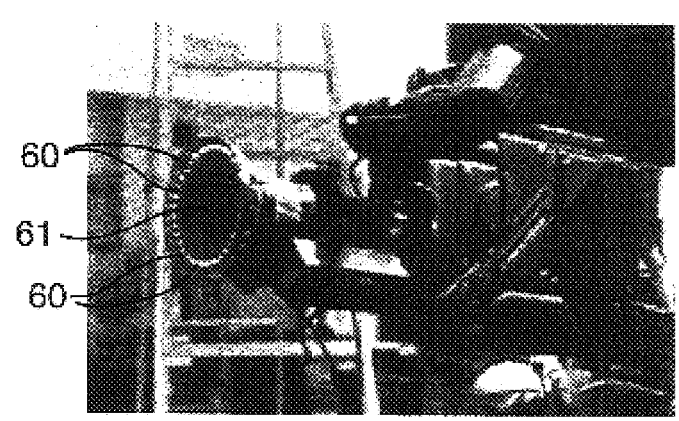
FIG. 6 illustrates a typical camera with a ring of LEDs around the camera lens.

Preferably, when using such a retroreflective material the source of colored light should be placed coincident with the camera lens. This may be done using a semi-silvered mirror set at a forty-five degree angle in front of the camera, which reflects a colored light to make it appear to come from the center of the lens. To change the key color, it is only necessary to change the lights on the cameras; there is no need to change the whole cyclorama. In a compact arrangement, as shown in FIG. 6, a ring of bright LEDs 60 is used around the camera lens 61 to illuminate the retro-reflective screen.

Figure 3A:
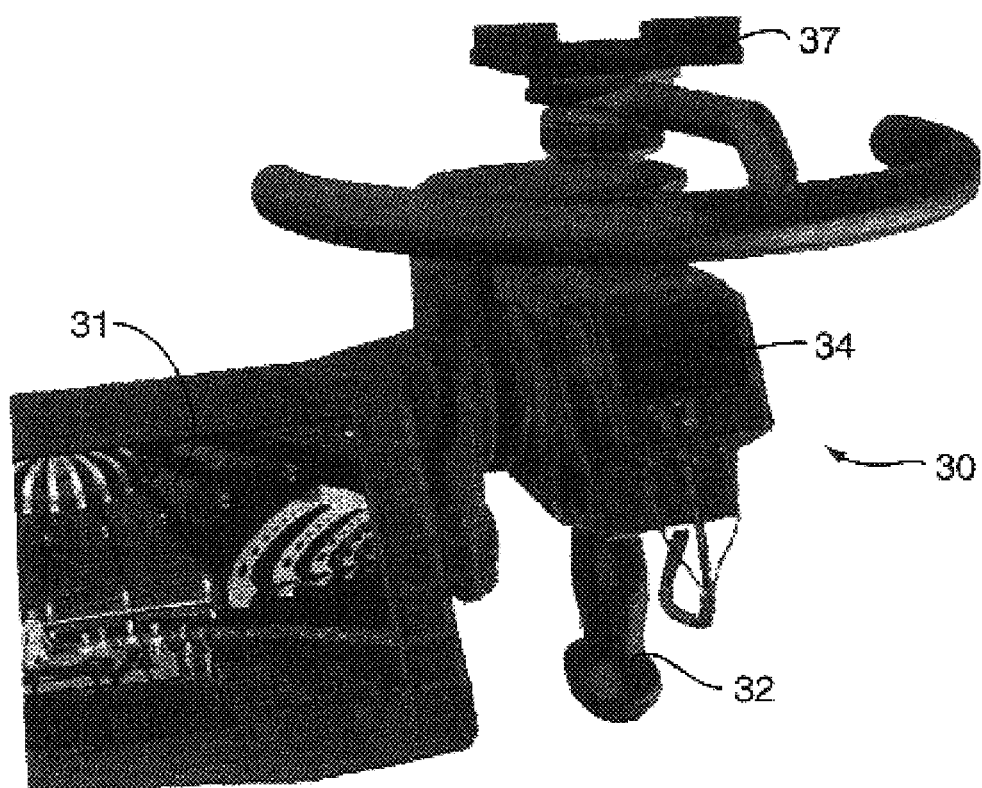
FIG. 3a is an illustration of a large screen TFT viewfinder.
Figure 3B:
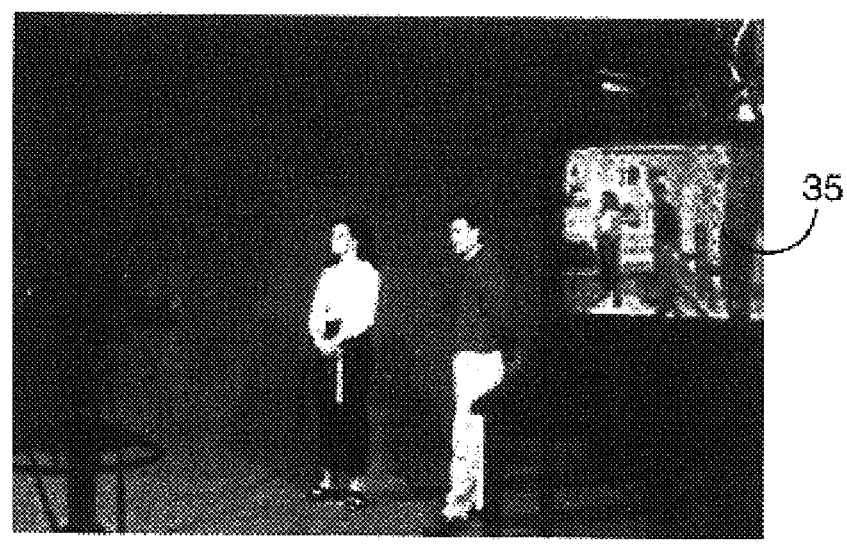
FIG. 3b is an illustration of a monitor on stage.
Figure 3C:
FIG. 3c is an illustration of a large screen monitor.

Referring to FIG. 3a, the digital movie camera 30 used in the present invention is preferably an advanced high band-with commercially available unit that may be configured with matte boxes, filters, and follow focus controls, and other features commonly found on professional cameras.

As shown in FIG. 3a, the camera 30 is rigged to an inverted fluid head 37, with camera grip 32 directly below the camera body 30, similar in function to a Steadicam® known to those skilled in the art. Attached to and movable with the camera 30 is a large flat panel TFT LCD backlit viewfinder 31 that displays, not just the camera image, but the overall real-time composite as well, allowing the camera operator to maintain proper composition of all elements in the shot. Responsive to a switch (not shown), the viewfinder 31 alternatively displays raw camera feed, composite feed, background only, alpha channel matte, or camera data overlay showing exposure, white balance, gray scale and color data, as well as aesthetic parameters set by the Director of Photography.

Illuminated LED readouts 34 on the back of the camera continuously display digital image data. An internal filter wheel responsive to a knob (not shown) provides basic daylight, incandescent and neutral density filters as required.

Figure 7:
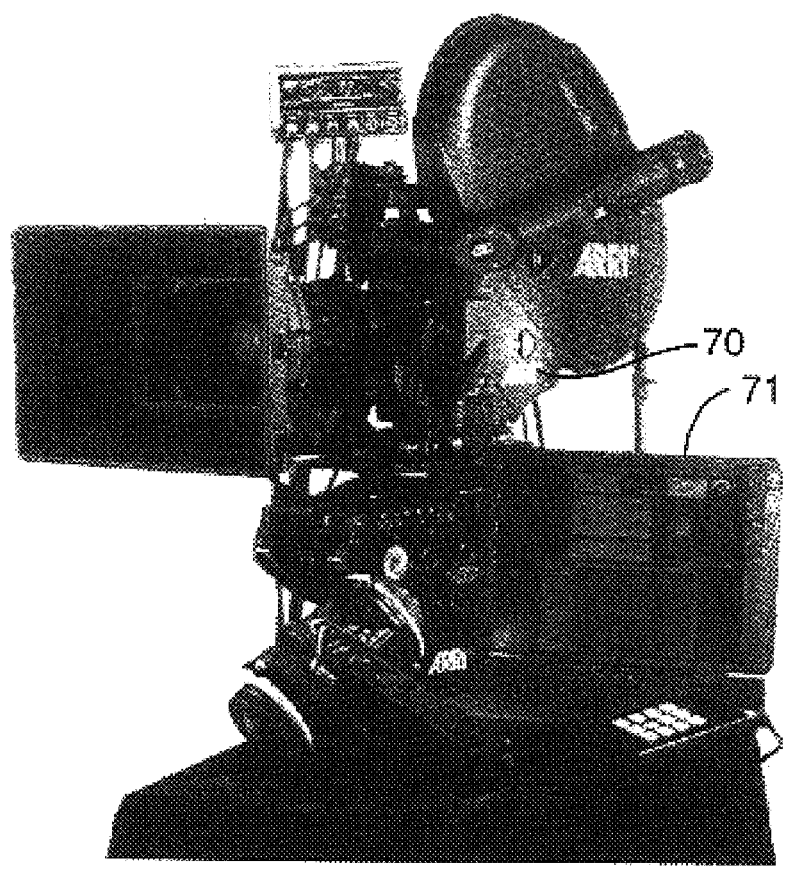
FIG. 7 illustrates a 35 mm film camera adapted to the present invention.

In an alternative embodiment, instead of a digital camera, a standard 35 mm film camera 70, such as the ARRI 435, as shown in FIG. 7, is adapted with laptop computer control 71, integrated video assist and data capture for virtualset feature film production.

In another embodiment, a high-definition television (HDTV) electronic CCD camera adapted to operate at 24 frames per second can be used to provide the resolution of 35 mm film. Such cameras, made by Sony for example, have been designed to accept cinematography lenses and to implement the core elements of a 24 frame per second post-production system including telecines, editors, switchers, converters, and multi-format monitors.

Figure 8:
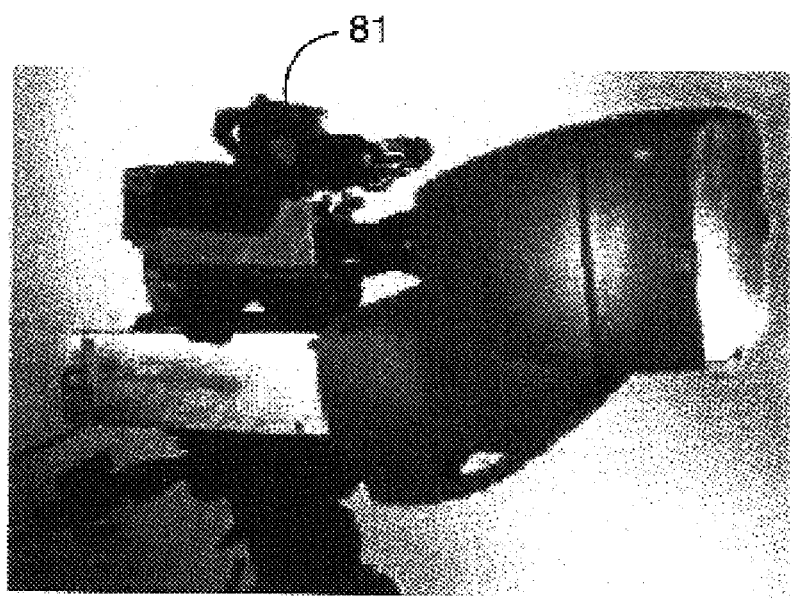
FIG. 8 illustrates a camera using Parallel Range Sensing™ technology.

In still another embodiment, live foreground action can be filmed using a digital camera 81 such as a ZCAM™, (FIG. 8) that captures spatial depth along with color and brightness to allow effective object extraction without the need for Chromakeying at all. Based on Parallel Range Sensing™ (PRS) technology, ZCAM™ captures both color information and Z-depth to enable simultaneous reading of the entire object, as opposed reading one pixel or one line at a time. ZCAM™ generates a depth map in real time by producing a video stream that indicates the distance of each pixel in the image from the camera, eliminating the requirement for a cyclorama or keying light.

Figure 9:
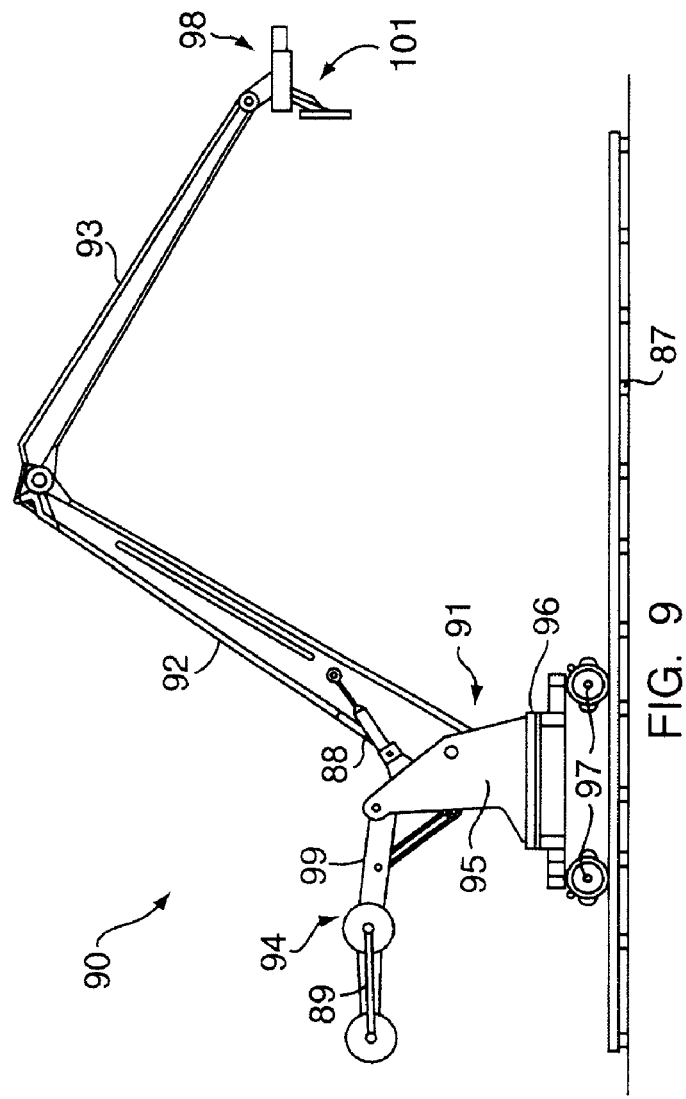
FIG. 9 is a schematic illustration of the camera support system of the present invention.

Referring to FIG. 9, the camera support system 90 of the present invention is designed to allow fluid and multi-dimensional movement of the camera at all times without the operator having to support the camera weight, which is especially important for filming action sequences. In the preferred embodiment, the camera support system includes a base 91, a boom arm 92 and a jib arm 93, both made of lightweight carbon fiber, a counterweight system 94, and a positional control system (not shown). The boom arm 92 and jib arm 93, combined preferably, have a reach of at least 20 feet. If a range of greater than 20 feet is required, the body can be moved either on floor wheels (not shown) or on tracks 87.

The base 91 includes a body rotatably mounted on a dolly 96. The dolly 96 includes rollers 97 that can be locked to prevent motion, or unlocked so that the entire camera support system can be moved. The boom arm 92 is pivotally attached to the body 91 and the jib arm 93 is pivotally attached to the boom arm 92. A camera mounting flange 98 is pivotally attached to the end of the jib arm 93 opposite the boom arm 92 and alternatively supports the camera and display apparatuses 101, discussed previously in connection with FIGS. 1., 3a, 7 and 8. The counterweight system 94 includes a counterweight boom arm 99 and a counterweight jib arm 89. The counterweight boom arm 99 is pivotally attached to the body 91 and is attached by a link member (not shown) to the boom arm 92. The counterweight jib arm 89 is pivotally attached to the counterweight boom arm 99 and is linked by cable (not shown) to the jib arm 93. Motion of the boom arm 92 and/or the jib arm 93 is counteracted by a corresponding motion of the counterweight boom arm 99 and/or the counterweight jib arm 89, respectively. The positional control system is preferably a fluid power system (e.g., pneumatic or hydraulic) that includes at least one boom cylinder 88, at least one jib cylinder (not shown), an accumulator, and appropriate piping and valving. The boom cylinder 88 acts between the base 91 of the camera support system 90 and the boom 92, and the jib cylinder acts between the boom 92 and the jib 93. The boom cylinder 88 supports the load of the boom 92 and attached apparatus not offset by the counterweight system 94. Likewise the jib cylinder (not shown) supports the load of the jib 93 and attached apparatus not offset by the counterweight system 94.

In the preferred embodiment, the force provided by the cylinders can be adjusted by the operator to achieve a desirable "feel" when handling the camera. The cylinders can, for example, be adjusted to provide sufficient force such that any or all sections of the crane can be completely supported and maintained in a particular position selected by the operator. On the other hand, the cylinders can be adjusted to provide less force and thereby allow the camera operator to bear a part of the load. The cylinders are sized to use relatively low fluid pressures (e.g., 100 psi or less). The low fluid pressures help reduce the friction within the cylinders, and thereby provide a more controllable system.

Figure 10:
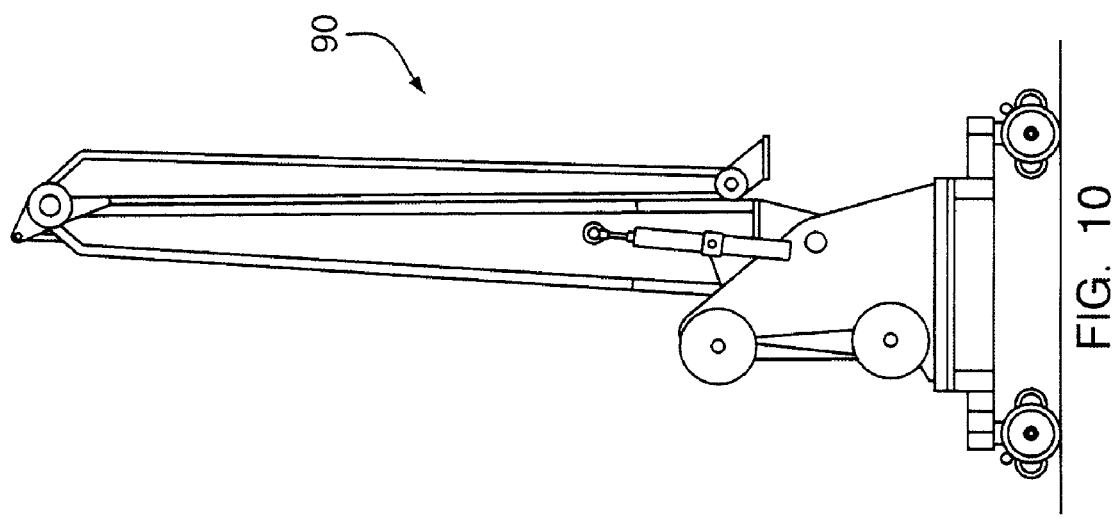
FIG. 10 is a schematic illustration of the camera support system of FIG. 9 in a fully retracted position.

An adjustable brake apparatus that acts on the cylinder rod of the cylinder to impede motion of the rod is also provided for the respective cylinders in order to facilitate transportation or storage. FIG. 10 depicts the camera support system 90 in a fully retracted position, typical of a storage, or non-use configuration.

As will be more fully described below, a plurality of encoders that sense the motion of various elements of the camera support system provide signals to a motion tracking system for precise synchronization and orientation of the virtual background with the recorded foreground image.

In the present invention, camera or object tracking is performed in real-time during production, using either conventional motion control systems, such as those made by Orad Hi-Tec Systems or Symah Vision, or using real-time motion capture techniques to track the camera, actors and/or props with optical or magnetic sensors. Motion tracking includes all of the high resolution meta-data, i.e., digital information that describes the actual content of film or video such as lighting set-up and camera position, necessary for post production editing.

Figure 11:
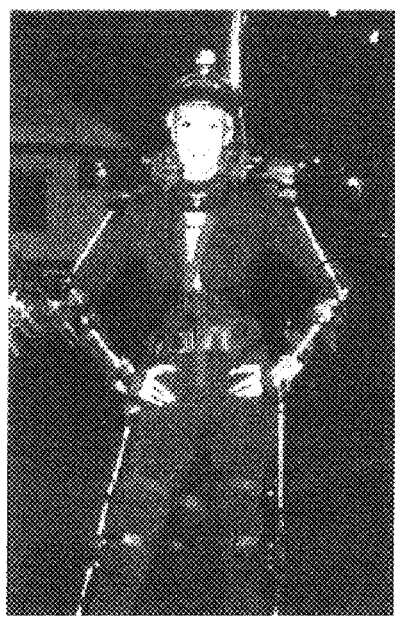
FIG. 11 illustrates motion tracking sensors on an actor.

Using conventional motion capture techniques, a camera motion tracking system receives encoded data from a plurality of extremely accurate optical sensors disposed at predetermined locations on the camera support system described above, or on an actor 110 as shown in FIG. 11, to provide accurate camera lens registration. Accurate lens registration is particularly important in tight close-ups and shots with limited depth of focus.

Figure 12A:
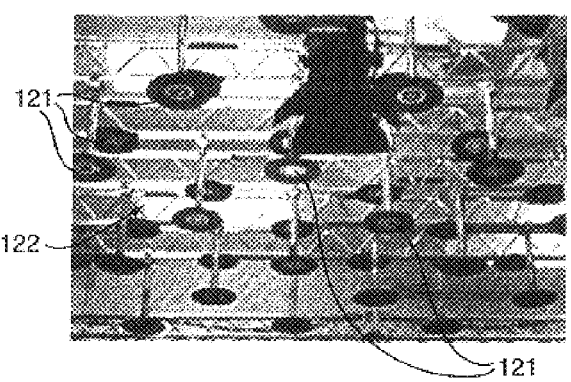
FIG. 12a illustrates a lighting grid with coded targets.
Figure 12B:
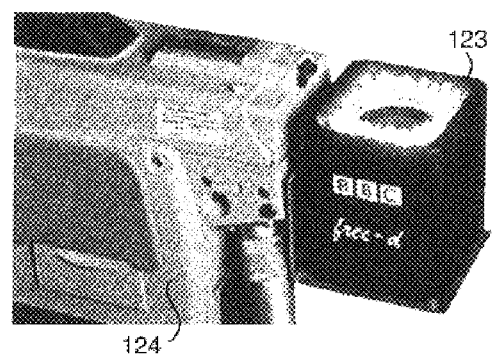
FIG. 12b illustrates a small CCD camera mounted on a studio camera.

In an alternative embodiment, shown in FIG. 12a, a series of coded targets 121 are placed in the studio lighting grid 122. Each target 121 is uniquely identified by a circular bar code which remains visible under all studio lighting conditions when retro-reflective material is used in the cyclorama. Referring to FIG. 12b, a small CCD camera 123 mounted on the studio camera 124 constantly views the targets 121. The exact position and orientation of the studio camera is then calculated using real time analysis of the image to identify each target. Knowing the physical location of the targets, the position of the camera is determined to a very high degree of accuracy. Zoom and focus axes are also encoded using optical sensors mounted on the lens. The free-d™ system licensed from the BBC by Radamec Broadcast Systems is an example of this type of motion tracking system.

In yet another embodiment, inertial and ultrasonic sensors may be used to track camera orientation and position over a virtually infinitely scalable range, using a system such as the InterSense Constellation™ expandable motion tracking technology.

In still another embodiment, applications like AliasWavefront's Maya Live™ and RealViz's MatchMover™ that using image-processing hardware to achieve through-the-lens camera tracking may be used instead of encoded cameras to provide accurate camera lens registration.

Central to the present invention are backgrounds of highly detailed virtual sets of computer generated images. Image generators with software packages such as Alias/Wavefront, SoftImage, or Multi Gen may be used to create virtual sets. Virtual sets may also be created by the digital capture and manipulation of actual locations using conventional digital photo/laser scanning techniques which simultaneously capture the image as well as the 3D shape of an object. In the latter case, all aspects of color, texture, lighting and shape are captured digitally, for manipulation in 3D computer graphics so that background objects can be altered, moved, re-colored, re-lit or otherwise modified, while remaining completely photorealistic.

Computer generated virtual sets used in the present invention may be 'virtual worlds' or 'virtual characters' or a combination thereof. Virtual worlds include a wide range of complex designs, from entire cartoon worlds, to 3-dimensional painted landscapes, to fully photorealistic set and location environments. Virtual worlds may be created using conventional techniques involving computer modeling of environments, objects and lighting through the refinement of complicated spline curves and polygon meshes. Alternatively, Image Based Modeling and Rendering (IBMR) software may be used to produce virtual worlds directly from a series of still images. In an image-based system, the model consists of a set of images of a scene and their corresponding depth maps. When the depth of every point in an image is known the image can be re-rendered from any nearby point of view by projecting the pixels of the image onto a new image plane in their proper 3D locations. Using a combination of digital photography and laser radar (LIDAR) locations one hundred meters in size may be photographically captured with millimeter accuracy, and transformed into fully photorealistic 3D Virtual Worlds.

Virtual characters include virtual humans as well as highly realistic and uniquely stylized characters such as virtual dinosaurs, aliens, and androids. With virtual characters created and animated using computer graphics techniques, backgrounds of large-scale virtual worlds can be fully populated in order to enhance the sense of realism and life-like action.

Three methods are typically used to animate virtual characters: keyframe animation, motion capture and behavioral animation. Keyframe animation is a process of describing the motion of a character over time by posing the figure in select frames and having the computer interpolate between them. Using a process known as Inverse Kinematics (IK) keyframes are animated by simply moving the effectors (typically the feet and hands) of characters' skeletons. With IK, the joints of the skeleton correctly follow the placement of the effectors, eliminating the need to keyframe each individual joint.

Motion Capture, also referred to as Performance Animation, is a process by which the animator physically tracks the joints and features of a human performer using encoders, which may be optical, magnetic or inertial.

A system such as Kinetix' Biped combines footstep sequence editing, motion capture import, and motion blending with the expressive control of traditional keyframe animation and IK. Using footstep placement and motion capture files animations for two-legged characters that walk, run, climb, jump, or dance can be sketched out. Motion blending allows for the combination of many different animation sketches into complex sequences. For enhanced realism, keyframe animation and IK can then be used, in addition to Performance Animation, to bring characters to life by introducing detailed movements and postures at exactly the right moment.

Behavioral animation is a type of procedural animation based primarily on smart software developed for physical robots, translated to the animation of virtual characters in a virtual world. In behavioral animation an autonomous character has the ability to determine its own actions to a certain extent. This gives the character a limited form of built-in intelligence, as well as some ability to improvise and adapt to its environment, thus freeing animators from the cumbersome task of specifying each detail of every character's motion over time.

With the use of virtual characters, large groups of digital extras that behave and move realistically can be created for virtual sets. Software such as Rampage, animates crowd movements by employing scientific rules of group behavior, going beyond simple deterministic simulations, by modeling both conscious and instinctive crowd patterns. Animators only need to specify sources (such as doors), obstacles (such as walls), attraction points, events and populations with different types of behavior.

For modeling and detailed creation of virtual characters, a character can either be created entirely from scratch using 3D computer modeling software, or by importing data from the 3D scanning of miniature maquettes or live human models into CG software for further refinement and animation. Paraform® has created software capable of transforming, parameterizing, and surfacing an extremely detailed point cloud of raw data, such as the scan of a human body. Complex processing algorithms facilitate the real-time conversion of raw 3D laser scanned data such as this into highly detailed models. The raw data is transformed into 3D models suitable for use within all widely used animation and modeling software applications.

Computer graphic software also allows for the realistic application of clothing and hair to virtual characters. Alias/Wavefront's Maya Complete package of software, for example, includes programs for creating realistic clothing as well as short hair for virtual characters. Virtually any style of clothing may be placed on a 3D character, automatically draping and gathering the material together for a realistic look, when the character is in motion. In addition, realistic CG hair and fur can be added to the surface of 3D models with all the attributes or real hair such as color, length, curl, and degree of baldness.

Computer generated imaging (CGI) used in the present invention includes both non-real-time and real-time imaging. Non-real-time imaging, as noted above, is often referred to as 'rendering', and is typically used post-production to render an image more realistic using computer graphics effects such as shadows, ray tracing, and reflections. Complex polygonal models can be rendered to include radiosity, atmospheric density, smoke, fog, caustics, as well as animated effects or characters. Non-real-time imaging systems used in the present invention, such as Cineon® or Flame™, primarily utilize general-purpose central processing units (CPU's).

Real-time imaging is used for pre-production, during production and for real-time editing. There are numerous alternatives in both hardware and software to creating real time CGI. For example, a Silicon Graphics ONYX2 Infinite Reality Engine can be coupled with a database prepared in MultiGen®, running on Paradigm®. Additionally, low end fast PCs and various software programs which can run on the Windows® operating system may also be used. Color and lighting interaction of the live action foreground with the computer-generated images of the background can be coordinated in real time using a radiosity program, such as Lightscape®.

Pre-production computer generated imaging, using the methods discussed above, includes the design, modeling, texturing, lighting, and animating of virtual worlds and characters to create a database of virtual sets. With the database of virtual sets, detailed blocking maps, storyboards, and animatics are developed so that the production process of actually shooting a final performance is informed by detailed preparation and familiarity with the set.

Real-time CGI is particularly important during the actual production process. During production, a real-time reference version of each virtual set is used to create a reference composite of the live action performance with the virtual set. The reference composite, available in real-time to the camera viewfinder, on monitors on the stage, in a screen room and to a non-linear editor, allows the director, cinematographer, cast and crew to explore, prepare and plan shots on stage within a virtual set.

With real-time computer graphic imaging and compositing, editing may be performed both prior to and during principal photography. As noted above, after a scene is shot, a direct video feed from the real-time composite to a non-linear editor allows the director to immediately determine if re-takes, inserts or revised performances are necessary. If so, the appropriate virtual set and its accompanying meta-data can be reconfigured while the cast is still available. Using real-time imaging, scene composition, continuity and editorial style are all identified or established early in the process. The director can also create a finished "preview" version of a film during pre-production by using a stand-in cast and a reference version of the virtual set in order to work the bugs out of a script, plan the shots and determine editorial pacing prior to principal photography.

Figure 13:
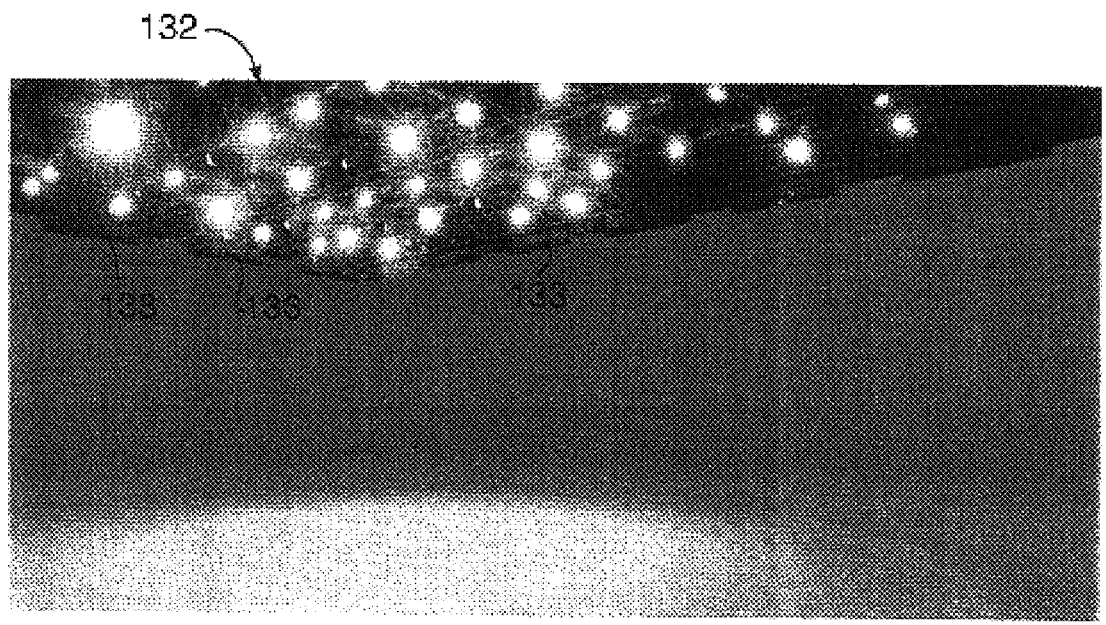
FIG. 13 depicts a studio lighting grid with fixtures.

Conventional lighting set-up for motion picture production is time-consuming and labor intensive. Referring to FIG. 13, the present invention overcomes these disadvantages through the use of a digitally controlled lighting grid 132 and fixtures 133. Using the same software as for the 3D modeling and animation of the virtual environment, digital information on the movement, color, intensity, and beam pattern of lighting fixtures is determined and transmitted to a digitally controlled lighting unit, such as Cyberlights, to remotely pan, tilt, zoom, colorize, dim and barndoor multiple units instantaneously.

The cyclorama is preferably dimmable, so that various exposures can be used for best depth-of-field effects. Large softlight banks are typically used to simulate overcast sky or interior fill.

Figure 14:
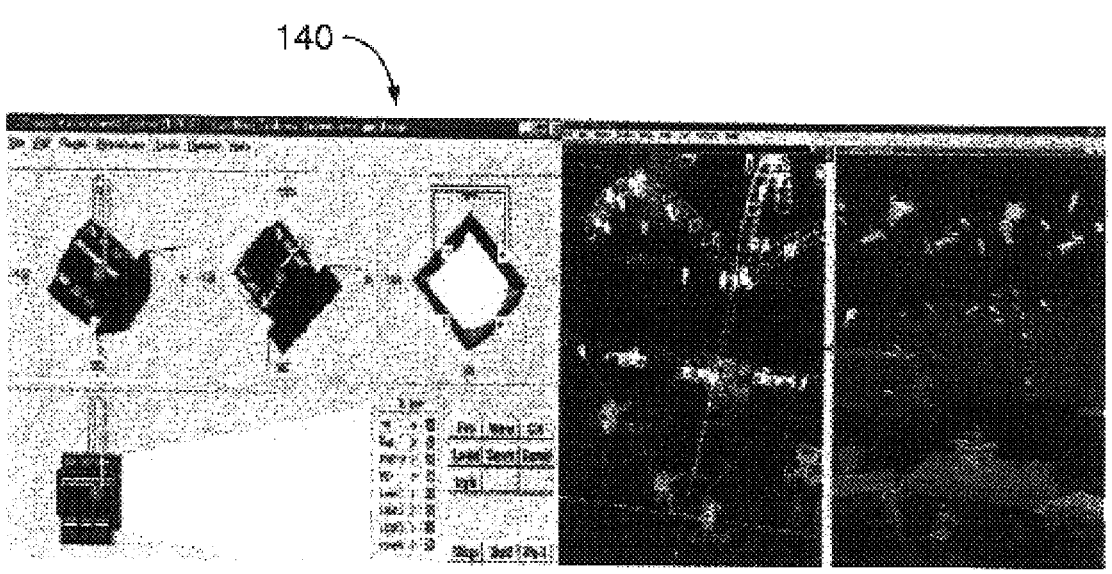
FIG. 14 is a schematic illustration of a monitor for a computer controlled lighting system.

In another embodiment, a computer assisted lighting design and automation system, such as Cast's WYSIWYG (What You See Is What You Get), which combines conventional CAD capabilities with 3D computer graphics, is used to integrate the real and virtual worlds. A WYSIWYG lighting control system includes a computer with monitor 140 (See FIG. 14) that displays in 3D graphics what is happening to physical lights on the stage as cues are programmed and played back from a workstation. Using such a lighting control system, entire scenes are pre-programmed and the physical light fixtures are automatically moved into position with the correct intensity, colors, focus, and attachments.

Figure 15:
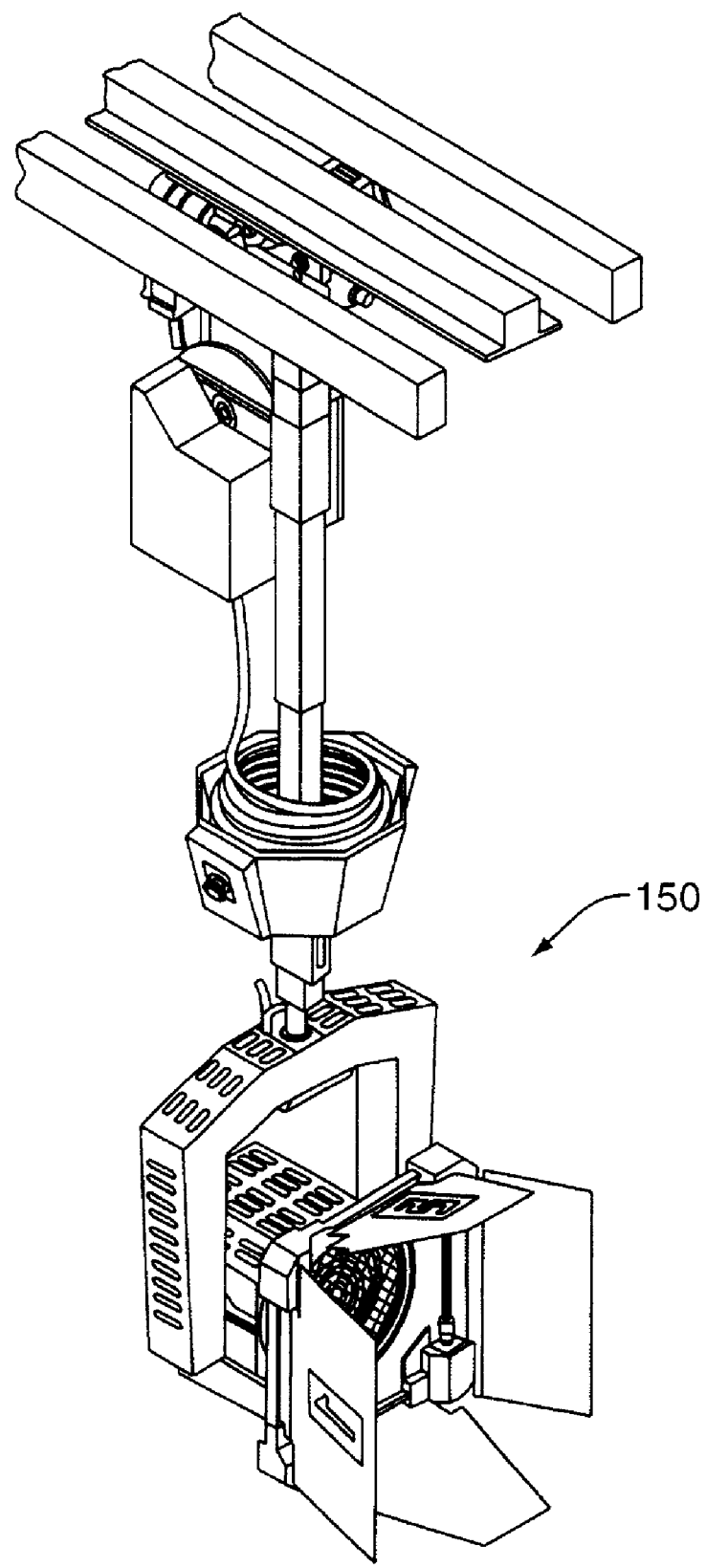
FIG. 15 is a schematic illustration of a robotic light used in the present invention.

In yet another embodiment, computer controlled robotic lighting systems 150, see FIG. 15, are used to program lighting instruments with individual or multiple looks, and record the looks in a library for recall as needed. These robotic lighting systems, developed by DeSisti Lighting for example, enable the pre-recording and playback of complex movements as well as remote control of all functions, e.g., pan, tilt, focusing, barn doors and gel changing, of each light in a studio. In a typical complex movement, large groups of lights are moved from one set-up to another and positioned at predetermined heights or horizontal locations.

An noted above, a direct video feed from the real-time composite of live foreground action and virtual backgrounds to a non-linear editor facilitates editorial decision making. Using the virtual set "reference" composites, available in real-time to the director and cinematographer, scenes, sequences or an entire film can be edited prior to and during principal photography. During production individual shots are precisely rendered and composited, based upon a frame accurate edit decision list (EDL) making it possible to final render CGI images and composite shots to exact cut lengths with no waste, greatly reducing post-production editing costs.

In the preferred embodiment all meta-data is online all the time, from pre-production through post-production. Using a system such as Avid Unity, simultaneous access to media throughout the production process is provided from a central location.

In another embodiment, using a 24P (24 frame per second) digital camera and a non-linear editor, such as the 24P Universal Mastering solution from Avid, which provides multi-format delivery from a single 24P source, whether film or digital, users can digitize and edit 24P media and produce NTSC PAL, SDTV, HDTV and film, as well as film cut lists and frame-accurate 24 fps edit decision lists (EDL's).

In yet another embodiment, the Advanced Authoring Format (AAF), an industry-driven, multimedia file format, is used to provide meta-data support including comprehensive source referencing and composition information. AAF allows cross-platform interchange of media and compositional information between AAF-compliant applications.

Inherent in the present invention is a database system that indexes, stores, and delineates digital assets including video clips, high resolution 3D models, editing information, and the like, which are typically very large blocks of data. The term BLOB (binary large objects) is commonly used to refer to them. Object relational databases can be used to manipulate and search these types of data. Object relational databases are hybrids of a multi-relational database management system (MRDBMS), known to those skilled in the art, and an object databases, such as Oracle, Microsoft SQL7, Illustra, or DB2 Universal Database. With the use of a hybrid or object relational database, instead of simply searching for data about digital assets the database content itself may be searched based on image and audio recognition.

Alternatively, the IBM DB2 Digital Library, Cinebase, SGI Studio Central, Avid Unity and Bulldog, may be used for comprehensive management of digital assets for production. Using cross-platform tools, such as Java and the Web, digital asset management is preferably open, platform independent and scalable. In one embodiment the Avid OMF (Open Media Format) is used to provide a virtual "wrapper" for content data that allows it to pass easily through each stage of the production and post-production processes, thus avoiding the time-consuming process of converting data into multiple formats. With comprehensive asset management capabilities, large digital media repositories of content databases may be stored and made available for redeployment across multiple platforms such as feature films, IMAX 3D, television, interactive games, etc.

Also inherent in the present invention is the potential to uniformly track the key elements of production, such as schedule, costs and output, in order to maintain more effective control over the entire production process. In the preferred embodiment, a unified system of networked project management software that comprehensively links together the information regarding the state of what has been developed or produced, the completed content elements, and the work process describing their creation, is provided to allow production management to refer to any data related to the production process, from the status of a 3D computer graphic world, to a time sheet or purchase order, as well as the whole shot annotation and approval process. Software packages such as Movie Magic, Microsoft Project, Outlook, and Exchange can be linked and incorporated into the present invention using a standard programming language such as HTML for the necessary matrix of linking software. Likewise those skilled in the programming art can customize the software for varying levels of information access and automation of key processes, such as script changes, schedule updates, design improvements, and approvals, as well as the monitoring and auditing of financial records.

While the invention has been described with reference to the preferred embodiment thereof, it will be appreciated by those of ordinary skill in the art that various modifications can be made to the structure and function of the individual parts of the system without departing from the spirit and scope of the invention as a whole.

I claim:

1. A recording apparatus support system comprising
    a base including a body rotatably mounted to a movable dolly;
    a boom arm pivotally mounted to the body;

a jib arm pivotally mounted to a distal end of the boom arm;

a recording apparatus mounting flange pivotally mounted to a distal end of the jib arm;

a recording apparatus mounted to the recording apparatus mounting flange;

a display disposed proximate to the recording apparatus; and a counterweight system for counterbalancing the boom arm and jib arm;

wherein the counterweight system provides substantially weightless movement of the recording apparatus and display by an operator.

2. The recording apparatus support system of claim 1 wherein the counterweight system comprises:

a counterweight boom arm for counter balancing the boom arm, pivotally mounted on an opposing side of the body relative to the boom arm, and a counterweight jib arm for counter balancing the jib arm, pivotally mounted to a distal end of the counterweight boom arm.

3. The recording apparatus support system of claim 2 comprising:

a boom cylinder for supporting the boom arm and operatively connected between the body and the boom, the boom cylinder responsive to signals from a control system; and a jib cylinder for supporting the jib arm and operatively connected between the boom arm and the jib arm, the jib cylinder responsive to the control system signals.

4. A recording apparatus support system comprising a base including a body rotatably mounted to a movable dolly;

a boom arm pivotally mounted to the body;

a jib arm pivotally mounted to a distal end of the boom arm;

a recording apparatus mounting flange pivotally mounted to a distal end of the jib arm;

a recording apparatus mounted to the recording apparatus mounting flange;

a display disposed proximate to the recording apparatus; and a counterweight boom arm for counter balancing the boom arm, and a counterweight jib arm for counter balancing the jib arm, said counterweight jib arm being pivotally mounted to a distal end of the counterweight boom arm.

* * * * *